J. NOLAN.
VALVE.
APPLICATION FILED FEB. 16, 1910.
976,489.
Patented Nov. 22, 1910.
2 SHEETS—SHEET 2.
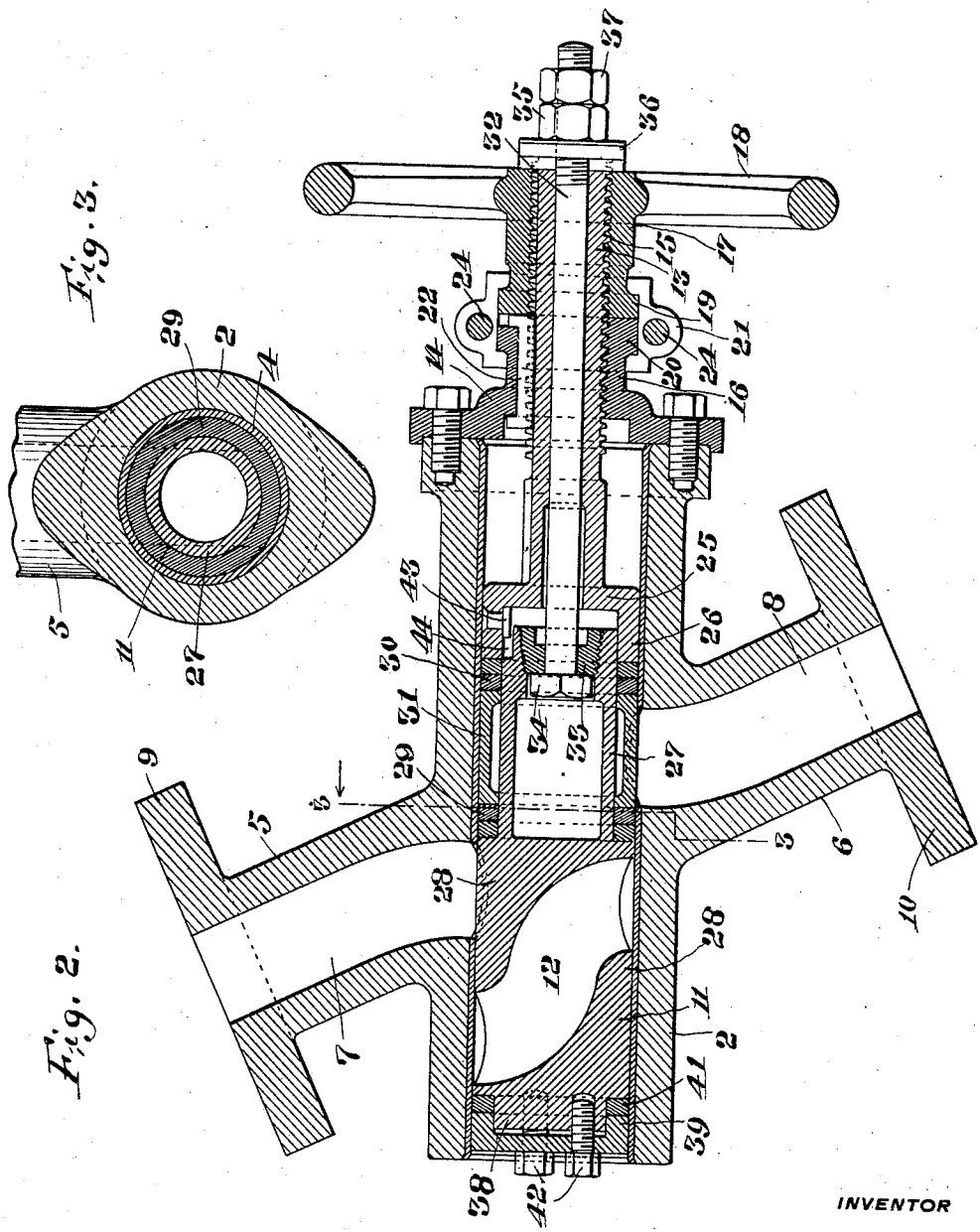
WITNESSES
E. M. Ware
R. Schleicher
INVENTOR
Johnston Nolan
BY A. V. Groupes
ATTORNEY

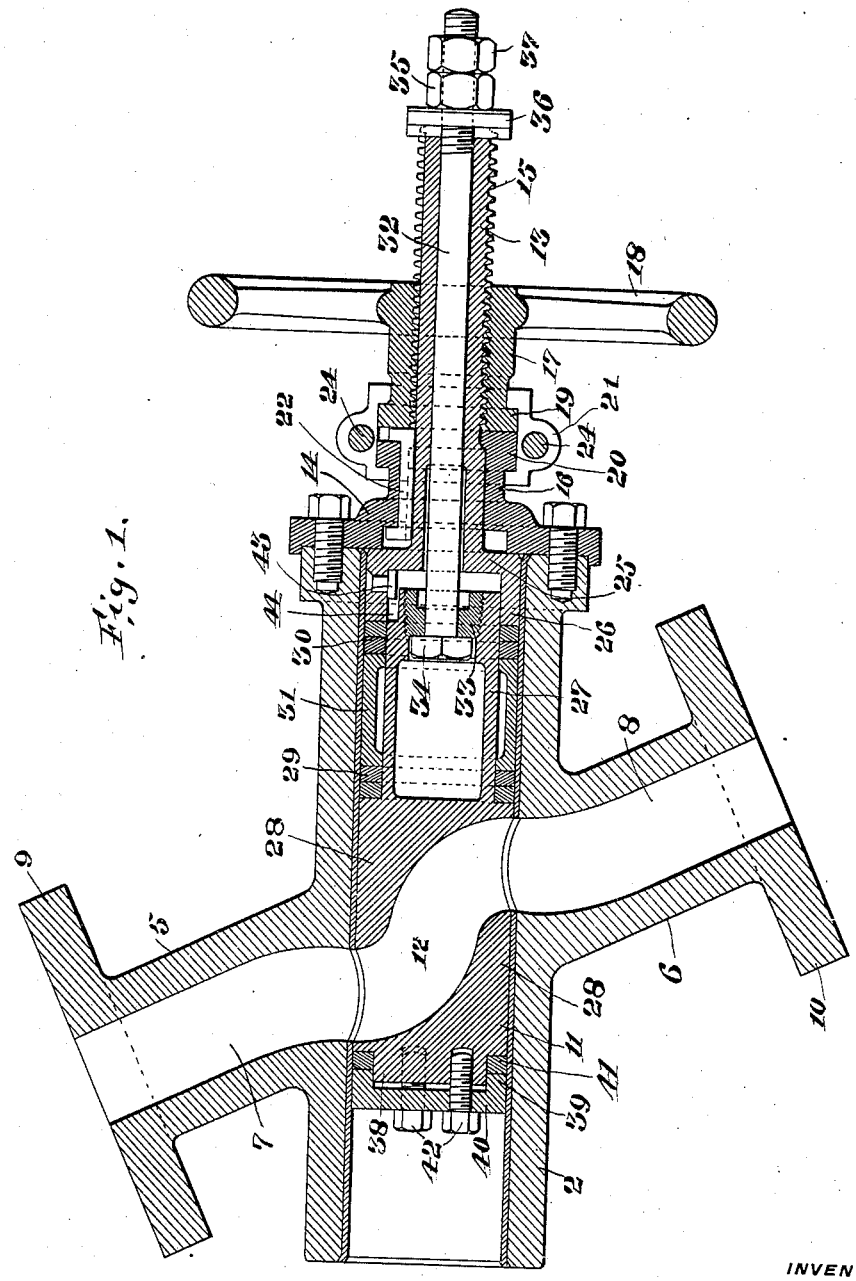

UNITED STATES PATENT OFFICE.

JOHNSTON NOLAN, OF PHILADELPHIA, PENNSYLVANIA.

VALVE.

976,489.

Specification of Letters Patent. Patented Nov. 22, 1910.

Application filed February 16, 1910. Serial No. 544,315.

*To all whom it may concern:*

Be it known that I, JOHNSTON NOLAN, a citizen of the United States, residing in the city and county of Philadelphia and State of Pennsylvania, have invented certain new and useful Improvements in Valves, of which the following is a specification.

My invention relates to blow-off valves of the type wherein are employed a cylindrical casing having lateral inlet and outlet openings and a piston within the casing and movable longitudinally to open and close communication between said openings.

The object of my invention, as generally stated, is to provide, in a valve of this type a novel, simple and efficient construction and organization of parts whereby a packing ring or rings may be employed, arranged at right angles to the longitudinal axis of the casing and engaged with the casing and the piston between said openings when the valve is closed, and whereby the maximum area of valve opening may be provided for a piston having a limited stroke and limited dimensions.

The invention consists in the novel construction and combinations of parts hereinafter fully described and claimed.

In the drawings:—Figure 1 is a longitudinal section of a valve embodying my invention, the valve being shown in the open position. Fig. 2 is a similar view, showing the valve in the closed position. Fig. 3 is a transverse section, on line 3—3 of Fig. 2.

The main body of the valve comprises a cylindrical casing 2 provided with oppositely-disposed, lateral extensions 5 and 6 through which extend lateral openings 7 and 8 which communicate with the interior of the casing 2 and constitute the inlet and outlet openings of the valve.

The opening 7 is located entirely on one side of a plane extending at right angles to the longitudinal axis of the casing 2, and the opening 8 is located entirely on the other side of said plane, providing a circular wall extending entirely around the interior of the casing between the openings 7 and 8, as shown, for a purpose hereinafter explained.

The outer ends of the extensions 5 and 6 are provided with flanges 9 and 10 respectively, by means of which the valve may be attached to a pipe or pipes.

Fitted to the interior of the casing 2 is a longitudinally movable piston 11, having an ogee curved passageway 12 extending therethrough, as shown, whereby, when the piston 11 is moved longitudinally within the casing 2, the passageway 12 may be brought into and out of registry with the openings 7 and 8 to open and close the valve by opening and closing communication between the openings 7 and 8.

Extending from one end of the piston 11 is a hollow stem 13, which extends through a central opening in a head 14 secured to and closing one end of the casing 2. The stem 13 is exteriorly screw-threaded as at 15, and it extends outwardly through the head 14 and is slidingly fitted to an opening in a boss 16 extending outwardly from the head 14.

Screwed on to the outer end of the stem 13 is the internally screw-threaded hub 17 of a hand wheel 18. The inner end of the hub 17 is provided with a flange 19 which abuts against a flange 20 on the outer end of the boss 16. Surrounding the inner end of the hub 17 and the outer end of the boss 16, is a split or two-part collar 21 provided on its interior with a circumferential groove to which are fitted the flanges 19 and 20 in a manner to permit the wheel 18 to be rotated and to prevent the movement of the wheel longitudinally of the stem 13.

The two parts of the collar 21 are held together by suitable bolts or screws 24, as shown, and the collar 21 is made in two pieces and held together by the bolts 24 for convenience in assembling the parts.

In order to prevent the rotation of the piston 11 and its stem 13 during the rotation of the hand wheel 18, I provide a suitable key 22 fitted to a groove in the boss 16, and to a keyway in the stem 13. The ends of the key 22 are engaged with the ends of the boss 16 to prevent longitudinal movement of the key with the stem 13.

By the construction just described, it will be seen that by rotating the hand wheel 18, the piston 11 may be moved longitudinally within the casing 2 to bring the piston opening 12 into or out of registry with the openings 7 and 8 to open or close the valve, as desired.

The piston stem 13 is formed on and projects from a head 25 which is provided with a flange or collar 26 surrounding the reduced portion 27 of the piston 11, the diameter of the main body 28 of the piston being equal to the interior diameter of the casing 2. Surrounding the reduced portion 27 of the piston between the collar 26 and main body 28 thereof, are two pairs of packing rings 29 and 30 held in spaced relation to each other by an interposed distance piece 31 surrounding the reduced portion, the rings 29 being arranged between the main body 28 of the piston and the distance piece 31, and the rings 30 being arranged between the collar 26 and the distance piece 31. It will thus be seen that if the collar 26 and main body 28 of the piston be forced toward each other the packing rings 29 and 30 will be squeezed between the parts engaged therewith and forced into close contact with the casing 2.

To adjust the packing rings 29 and 30 I provide a rod 32 which extends through the hollow stem 13 and through a head 33 screwed into the end wall of the reduced portion 27 of the piston. The inner end of the rod 32 is provided with a head 34 which engages the head 33, and the outer end of the rod 32 is screw-threaded and provided with a nut 35 which bears against a collar 36 surrounding the rod 32 and provided with projections engaging the outer end of the stem 13. It will thus be seen that by tightening the nut 35 the collar 26 and the body 28 of the piston will be forced toward each other to adjust the rings 29 and 30. A suitable jam nut 37 is provided on the outer end of the rod 32 to lock the nut 35 in place, after the adjustment of the packing has been effected.

The rod 32 not only serves as a means for adjusting the packing rings 29 and 30, but it also serves to hold the parts of the piston 11 and its stem 13 together so that they may be adjusted as a unit by turning the hand wheel 18.

The outer end of the body of the piston 11 is provided with a reduced portion 38 which is surrounded by a flange or collar 39 projecting inwardly from an end head 40. Interposed between the body of the piston and the collar 39 is a packing ring 41 arranged to make a tight joint between the outer end of the piston 11 and the casing 2. The end head 40 is held in place by cap screws 42 screwed into the body of the piston. By turning the screws 42, the head 40 and therewith the flange 39 may be forced toward the body 28 of the piston in a manner to adjust or tighten the interposed packing ring 41.

As previously described, the stem 13 is prevented from rotating by the key 22. The collar 26, being formed integral with the stem 13, is also prevented from rotating by the key 22. The body 28 of the piston 11 is prevented from rotating by a projection 43 extending from the collar 26 and into a slot 44 in the reduced portion 27 of the piston.

The packing rings 29, 30 and 41 are so located with respect to each other and to the openings 7 and 8 and passageway 12, that when the piston 11 is in the open position, as shown in Fig. 1, the rings 29 and 41 will be engaged with the piston 11 and the casing 2 entirely around the interior thereof on each side of the two openings 7 and 8, preventing leakage of fluid between the piston and the casing; and that when the piston 11 is in the closed position as shown in Fig. 2, the rings 29 will be engaged with the piston 11 and the casing 2 entirely around the interior thereof between the openings 7 and 8, and the rings 41 and 30 will be engaged with the piston 11 and the casing 2 entirely around the interior thereof and outwardly of the two openings 7 and 8, the rings 29 effectually cutting off communication between the openings 7 and 8, and the rings 41 and 30 preventing leakage of fluid from the openings 7 and 8 respectively, between the piston and the casing.

It will be observed that when the piston 11 is in the open position, as shown in Fig. 1, the main body 28 of the piston is in engagement with the entire inner wall of the casing 2 between the openings 7 and 8, thereby protecting that portion of the inner wall of the casing which is engaged by or forms a seat for the packing rings 29 when the piston is in the closed position, as shown in Fig. 2. Thus, when the valve is open, the seat for the rings 29 will be protected against having any scale, grit or other injurious substances blown against the same.

By providing the ogee curved passageway 12 I am enabled to employ packing rings arranged at right angles to the longitudinal axis of the piston and at the same time make the passageway of greater area than would be otherwise possible with the same dimensions of the different parts of the valve and with the same piston stroke. This is an important feature of my invention, as it not only saves material in constructing a valve having a given area of piston opening but it requires less movement of the piston to open and close the valve than would be required with a straight piston opening of the same area.

I claim:

1. In a valve, the combination of a cylindrical casing provided with a lateral inlet opening located entirely on one side of a plane extending at right angles to the axis of the casing and provided with a lateral outlet opening located entirely on the other side of said plane; a piston within the casing and movable to a closed position cutting off communication between said openings and to an open position affording communication between said openings; a packing ring surrounding the piston and engaged therewith and with the casing between said openings when the piston is in the closed position; a second packing ring surrounding the piston and engaged therewith and with the casing outwardly of one of said openings when the piston is in the closed position; a third packing ring surrounding the piston and engaged therewith and with the casing outwardly of the other of said openings when the piston is in the closed position and means operative to move the piston.

2. In a valve, the combination of a cylindrical casing provided with a lateral inlet opening located entirely on one side of a plane extending at right angles to the axis of the casing and provided with a lateral outlet opening located entirely on the other side of said plane; a piston within the casing and having a passageway extending therethrough and movable to a closed position in which said passageway is out of registry with said openings and to an open position in which said passageway is in registry with said openings; a packing ring surrounding the piston and engaged therewith and with the casing between said openings when the piston is in the closed position; a second packing ring surrounding the piston and engaged therewith and with the casing outwardly of one of said openings when the piston is in the closed position; a third packing ring surrounding the piston and engaged therewith and with the casing outwardly of the other of said openings when the piston is in the closed position and means operative to move the piston.

3. In a valve, the combination of a cylindrical casing provided with a lateral inlet opening located entirely on one side of a plane extending at right angles to the axis of the casing and provided with a lateral outlet opening located entirely on the other side of said plane; a piston within the casing and having an ogee passageway extending therethrough and movable to a closed position in which said passageway is out of registry with said openings and to an open position in which said passageway is in registry with said openings; a packing ring surrounding the piston and engaged therewith and with the casing between said openings when the piston is in the closed position; a second packing ring surrounding the piston and engaged therewith and with the casing outwardly of one of said openings when the piston is in the closed position; a third packing ring surrounding the piston and engaged therewith and with the casing outwardly of the other of said openings when the piston is in the closed position; and means operative to move the piston.

In testimony whereof I affix my signature, in the presence of two witnesses.

JOHNSTON NOLAN.

Witnesses:
E. M. WARE,
S. I. HARPER.